Nov. 19, 1968    D. W. HORLEY ET AL    3,411,364
CONTACT LENS INSTRUMENT
Filed Dec. 7, 1965

3,411,364
CONTACT LENS INSTRUMENT

Donald W. Horley, Winchester, and Donald R. Korb, Boston, Mass., assignors to Boylston Research Associates, Boston, Mass., a partnership consisting of Donald W. Horley and Donald R. Korb
Filed Dec. 7, 1965, Ser. No. 512,159
5 Claims. (Cl. 73—432)

ABSTRACT OF THE DISCLOSURE

An instrument for simulating eyelid pressure on a contact lens includes a tube 4⅜ inches long in which is axially received a 1/10 inch diameter rod, the end of which protrudes ¾ inch from the tube. The forward end of the rod is rounded and coated with a soft compound which has a high coefficient of friction and prevents scratching of the lens. A 30–40 turn helical spring of 0.009 inch music wire surrounds the rods and applies a biasing force of about 20 grams to the rod which remains substantially constant over the permitted range of travel of the rod (less than ¾ inch). The exterior surface of the tube is knurled and has several weep holes therethrough.

---

This invention relates to the fitting of contact lenses, and more particularly to an instrument and method for observing the fit under the dynamic effect of a blinking eyelid.

The primary object of the invention is to provide an instrument and method for uniformly and accurately simulating the eccentrically compressive forces of the blinking upper lid upon a contact lens while allowing simultaneous and virtually unobstructed observation, under the entire area of the lens, of the fluorescein pattern produced by such compression.

The invention features an eyelid simulating contact lens compressor in which a rod having a compressor portion of small diameter relative to the lens is biased axially in a tube with the compressor portion outside the tube under a force that remains substantially constant as the compressor portion is placed against the lens and pressed back toward the tube. This force, which has been determined by empirical observation, accurately simulates the maximum expected compressive force of the eyelid on the lens.

Other objects, features, and advantages will appear from the following description of a preferred embodiment of the invention, taken together with the attached drawings thereof, in which.

Figure 1:
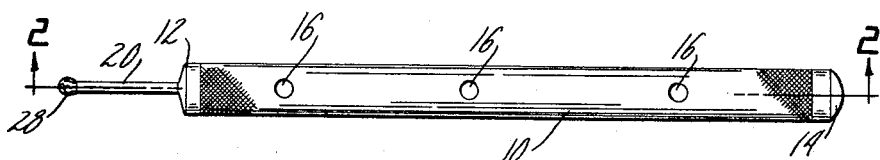
FIG. 1 is an elevation of the instrument of the invention.

Tube 10 (approximately .350″ OD x 5/16″ D x 4⅜″ long stainless steel) has a guide insert 12 (¾″ long) at its forward end and a guide sleeve 14 (15/16″ long) at its rearward end. The exterior surface of the tube is knurled and has several weep holes 16 (for sterilization) therethrough. Flange 17 (1/16″ thick) of sleeve 14 caps the rearward end of the tube.

Rod 20, of 1/10″ diameter stainless steel, is axially disposed within tube 10, riding at its rearward end in sleeve 14 and protruding from the tube through clearance sized opening 22 in insert 12. Annular washer 24, clearance fit to tube 10 and welded to rod 20 at 15/16″ from its forward end, limits (in cooperation with shoulder 26 of insert 12) the protrusion of the rod to ¾″ in its extended position. The forward end of the rod is rounded and plastic coated with a substance, such as an epoxy compound, soft enough to prevent scratching but having a high coefficient of friction (a suitable substance has been found to be that sold by Econo-Clark Co. under the trade name Comfort-Cote), to form a lens compressor portion 28.

Figure 2:
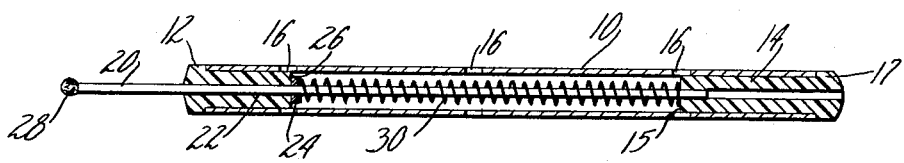
FIG. 2 is a section through 2—2 of FIG. 1.

A helical spring 30 (approximately 30–40 turns of .009 inch music wire) surrounds rod 20 inside tube 10 between washer 24 and shoulder 15 of sleeve 14. Spring 30 biases rod 20 in its extended position (FIG. 2) under a force of the order of 20 grams, preferably 19 to 20 grams, this force remaining substantially constant (within the limits of a gram or so) as compressor portion 28 moves from its extended position most of the way back toward tube 10. For haptic (scleral) practice it may be desirable to increase the spring force by approximately 50%.

Figure 3:
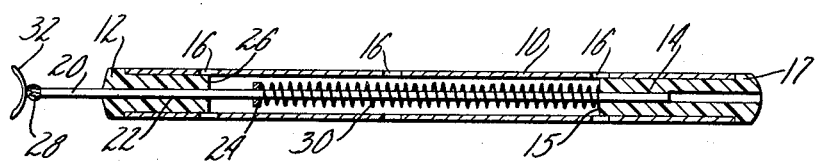
FIG. 3 is a section similar to that of FIG. 2, but with the instrument shown in use pressed against a lens.

In operation, with a lens in place, fluorescein dye is introduced into the palpebral fissure and the usual observation is made under ultraviolet light. Tube 10 is then manually grasped and compressor portion 28 is placed in contact with the external surface of the lens 32 (FIG. 3) while the eyelid is restrained from blinking. Eyelid simulating pressure is applied to the lens by forward movement of the tube, spring 30 undergoing compression (FIG. 3), and the fluorescein pattern is reobserved. The small diameter of portion 28 relative to the lens diameter (the latter normally being between 7 and 11 mm.) enables observation of virtually the entire area under the lens without direct or shadow obstruction. The spring biased arrangement makes the applied eyelid simulating force independent of the manual force exerted by the observer. The force can be applied eccentrically as desired, thereby enabling accurate simulation of the dynamic vector quality of eyelid forces. The rounding of the compressor portion assures that the force will always be applied normal to the lens surface and that it will be independent of the angle at which the rod is introduced. The plastic coating on the surface of compressor portion 28 improves the coefficient of friction of that surface relative to the lens while eliminating the possibility of scratching the lens.

The instrument as described is useful in similar fashion for procedures such as evaluation of secondary radius bearing characteristics, observation of the tertiary radius for venting and edge clearance, peripheral alignment and fitting of scleral lenses, blanching, etc.

Other embodiments will occur to those skilled in the art and are within the following claims.

We claim:

1. An eyelid simulating contact lens compressor comprising, an elongated tube and an elongated rod extending axially within said tube and having at one end a compressor portion adapted to engage a contact lens in position on the eye of a patient, said compressor portion being substantially smaller than said tube to maximize the observable area of the contact lens and the patient's eye so that the influence of simulated eyelid pressure provided by the compressor on the contact lens and the patient's eye may be observed by the examiner, the surface of said compressor portion having a high coefficient of friction with respect to the lens material and being softer than the lens material, said compressor portion being biased in an extended position outside said tube under a force that remains substantially constant as said portion is moved by pressure against said lens from said extended position through a substantial distance toward said tube, whereby said compressor in engagement with a contact lens in position on the eye of a patient does not slip on the surface of said lens and does not scratch the lens.

2. The compressor of claim 1 wherein said rod is biased under a force approximately of the order of 20 grams.

3. The compressor of claim 1 wherein said tube contains holes therethrough for sterilizing said rod.

4. An eyelid simulating contact lens compressor comprising
- an elongated stainless steel cylindrical exteriorly knurled tube having sterilization holes through its wall,
- an elongated stainless steel rod extending axially within said tube and having at one end a rounded compressor portion of diameter of the order of 0.1 inch and coated with a substance useful to prevent said portion from slipping along and scratching said lens,
- at least one guide element for aligning said rod in said tube,
- a stop element cooperating with a stop portion of said rod to prevent said rod from falling out of said tube,
- and a coil spring surrounding said rod in said tube for biasing said compressor portion in an extended position outside said tube under a force of the order of 20 grams that remains substantially constant as said portion is moved by pressure against said lens from said extended position through a substantial distance toward said tube.

5. An eyelid simulating contact lens compressor comprising, an elongated tube and an elongated rod extending axially within said tube and having at one end a compressor portion adapted to engage a contact lens in position on the eye of a patient, said compressor portion being substantially smaller than said tube to maximize the observable area of the contact lens and the patient's eye so that the influence of simulated eyelid pressure provided by the compressor on the contact lens and the patient's eye may be observed by the examiner, said compressor portion being a convex surface coated with a substance useful to prevent said portion from slipping along and scratching said lens and being biased in an extended position outside said tube under a force that remains substantially constant as said portion is moved by pressure against said lens from said extended position through a substantial distance toward said tube.

References Cited
UNITED STATES PATENTS

| | | | |
|---|---|---|---|
| 2,622,439 | 12/1952 | Copper | 73—80 |
| 2,984,099 | 5/1961 | Tolman | 73—80 |

RICHARD C. QUEISSER, *Primary Examiner.*

JAMES H. WILLIAMSON, *Assistant Examiner.*